(12) United States Patent
Zukerman et al.

(10) Patent No.: US 10,257,140 B1
(45) Date of Patent: Apr. 9, 2019

(54) CONTENT SHARING TO REPRESENT USER COMMUNICATIONS IN REAL-TIME COLLABORATION SESSIONS

(71) Applicant: Google Inc., Mountain View, CA (US)

(72) Inventors: Jokubas Zukerman, San Francisco, CA (US); Marco Paglia, San Francisco, CA (US); William Frederick Kiefer, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 748 days.

(21) Appl. No.: 14/817,849

(22) Filed: Aug. 4, 2015

(51) Int. Cl.
  *G06F 17/30* (2006.01)
  *H04L 12/58* (2006.01)
(52) U.S. Cl.
  CPC ........ *H04L 51/10* (2013.01); *G06F 17/30023* (2013.01); *G06F 17/30864* (2013.01); *H04L 51/046* (2013.01)
(58) Field of Classification Search
  CPC ... H04L 51/10; H04L 51/46; G06F 17/30864; G06F 17/30023
  See application file for complete search history.

(56) References Cited

U.S. PATENT DOCUMENTS

| 9,042,923 | B1* | 5/2015 | Mirho | H04W 4/14 |
| | | | | 455/412.1 |
| 2003/0167264 | A1* | 9/2003 | Ogura | G06F 17/30265 |
| 2005/0223071 | A1* | 10/2005 | Hosono | H04M 1/72552 |
| | | | | 709/206 |
| 2014/0012927 | A1* | 1/2014 | Gertzfield | G06Q 50/01 |
| | | | | 709/206 |
| 2014/0161356 | A1* | 6/2014 | Tesch | H04L 51/063 |
| | | | | 382/196 |
| 2014/0215505 | A1* | 7/2014 | Balasubramanian | |
| | | | | H04N 21/4722 |
| | | | | 725/13 |
| 2014/0351350 | A1* | 11/2014 | Lee | H04L 51/16 |
| | | | | 709/206 |
| 2016/0171538 | A1* | 6/2016 | Balasubramanian | |
| | | | | G06Q 30/0255 |
| | | | | 705/14.53 |
| 2016/0180560 | A1* | 6/2016 | Patel | H04M 1/72552 |
| | | | | 345/636 |
| 2016/0343040 | A1* | 11/2016 | Garrity | H04W 4/21 |
| 2016/0359987 | A1* | 12/2016 | Laliberte | H04L 51/32 |

OTHER PUBLICATIONS www.messenger.com "Conversations come to life on Messenger"; retrieved from https://www.messenger.com/features on Aug. 4, 2015.
(Continued)

*Primary Examiner* — Larry D Donaghue
(74) *Attorney, Agent, or Firm* — Lowenstein Sandler LLP

(57) ABSTRACT

A processing device analyzes a user communication as the user communication is being provided by a user of a source device to a user of a target device as part of a collaboration session between the user of the source device and the user of the target device. The processing device selects a media item based on content of the user communication. The selected media item has well-known content. The processing device adds at least a portion of the selected media item to the collaboration session for presentation to at least one of the source device or the target device.

20 Claims, 6 Drawing Sheets

(56) References Cited

OTHER PUBLICATIONS

Vilches, Jose, "Google Hangouts for iOS gets visual makeover, animated stickers and video messaging," Feb. 28, 2014; retrieved from http://www.techspot.com/news/55847-google-hangouts-for-ios-gets-visual-makeover-animated-stickers-and-video-messaging.html on Aug. 4, 2015.

* cited by examiner

US 10,257,140 B1

CONTENT SHARING TO REPRESENT USER COMMUNICATIONS IN REAL-TIME COLLABORATION SESSIONS

TECHNICAL FIELD

Aspects and implementations of the disclosure relate to content sharing, and more specifically, to content sharing to represent user communications in real-time collaboration sessions.

BACKGROUND

Messaging applications, such as text messaging applications, allow users to converse using short electronic messages that are delivered in real-time. Video collaborations over the Internet (e.g., videoconferences, telemedicine, etc.) are becoming increasingly common as broadband access and applications that take advantage of broadband connectivity proliferate.

Conversations between users using typical video collaborations are generally limited to the user provided content, such as video and/or audio of the user speaking. Conversations between users using typical messaging applications are generally limited to the user provided content, such as text. Some conventional messaging applications allow users to manually include emotional icons, stickers, and/or images in a message to add user expression to the message, but still limit a user's ability to express emotion in the message to static representations. Some traditional messaging applications allow users to manually create and/or select videos to add to a message, which may take significant time and user effort in creating, selecting, and delivering the video as part of the message.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device analyzes a communication as the user communication is being provided by a user of a source device to a user of a target device as part of a collaboration session between the user of the source device and the user of the target device. The processing device selects a media item based on content of the user communication. The media item has well-known content. The processing device adds at least a portion of the selected media item to the collaboration session for presentation to at least one of the source device or the target device.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
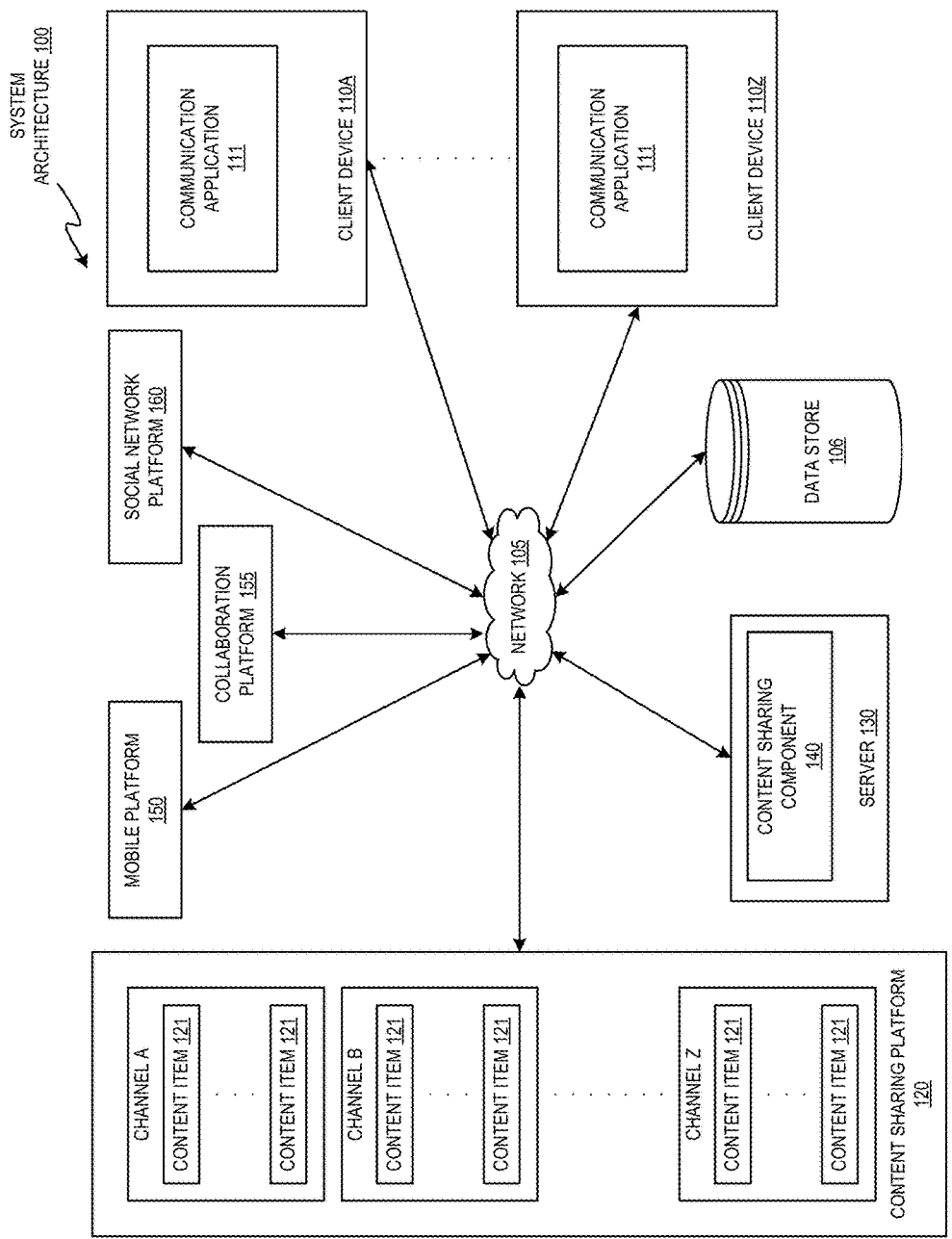
FIG. 1 depicts illustrative system architecture, in accordance with one implementation of the present disclosure.

Aspects and implementations of the disclosure are directed to content sharing to represent user communications in real-time collaboration sessions. Implementations disclosed can be applied to user collaboration sessions conducted, for example, via messaging applications, audio and/or videoconferences, audio and/or video chat, audio and/or videoconference rooms, audio and/or video chat rooms, etc., in which user communications are transmitted and/or received by devices of one or more users.

A user communication can include, for example, an audio/video communication in a video chat, a text message, an instant message, a video message, and a social networking message. The term "real-time" indicates that a transmission of a user communication from sender to receiver and/or receipt of the user communication by the receiver is made within a specified time constraint (e.g., under 50 microseconds). For example, during a collaboration session via video chat or videoconference, a real-time user communication includes video transmission of a user and audio transmission of the user as the sender user is speaking, and receipt of the video and audio transmission by the receiver user as the sender user is speaking.

In another example, there may be a collaboration session using a messaging application (e.g., text messaging application), and a real-time user communication can include transmission of a text message by a sender and receipt of the text message by the receiver within the specified time constraint to create a feeling for the users that is similar to a spoken conversation. Chat messages, text messages, instant messages, video messages, and social networking messages are generally short in order to enable recipient users to respond quickly. Some user communications, such as text messages, instant messages, and social networking messages can be transmitted bi-directionally between users, when each user chooses to complete a user communication and instruct (e.g., click "send") a communication application (e.g., text messaging application) to transmit the user communication. Some messaging applications (e.g., text messaging application, instant messaging application) can use push technology to provide real-time user communications, which transmits user communications character by character, as the user communications are composed.

User collaborations between users using typical messaging applications are generally limited to the user provided content, such as text. Some conventional messaging applications allow users to manually include emoticons, stickers, and images in a user communication (e.g., text message) to add user expression to the user communication. Such conventional messaging applications still limit a user's ability to express emotion in the user communication to static representations. Traditionally, users can manually create a user communication (e.g., video message in a video messaging application) that includes video content, which may take significant time and user effort in creating and/or selecting, and delivering the video content as part of the user communication.

Accordingly, described herein in various implementations are technologies that enhance user collaborations by automatically adding a media item (e.g., video clip, audio clip, animated image), which provides addition context to enrich or represent at least a portion of user communication, to a user collaboration. Implementations of the present disclosure select a media item that is associated with popular culture ("pop culture") to enrich or represent a user communication. Implementations of the present disclosure can reduce the time to add emotional context to a user communication by automatically adding a media item for a user communication to a collaboration session without a user having to manually include emoticons, stickers, etc. in the user communication. For example, a user may type a text message "Hasta la vista baby" using a text messaging application on a smartphone. Implementations of the present disclosure can automatically select an iconic pop culture video clip from the science fiction action film *Terminator 2: Judgment Day*, and can deliver the text message and/or the video clip to one or more users in the collaboration session.

FIG. 1 illustrates an example of system architecture 100, in accordance with one implementation of the disclosure, for content sharing to represent user communications in real-time collaboration sessions. The system architecture 100 includes client devices 110A through 110Z, a network 105, a data store 106, a content sharing platform 120, a server 130, and a mobile platform 150.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items. Content sharing platform 120 may include any type of content delivery network providing access to content and/or media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel.

Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. An activity feed may be a list of recent activity associated with the user and occurring on the social network. If a user subscribes to multiple channels, the activity feed for each channel to which the user is subscribed can be combined into a syndicated activity feed. Information from the syndicated activity feed can be presented to the user. Although channels are described as one implementation of a content sharing platform, implementations of the disclosure are not limited to content sharing platforms that provide content items via a channel model.

Each channel may include one or more content items 121. Examples of a content item 121 can include, and are not limited to, digital video, digital movies, animated images, digital photos, digital music, digital audio, website content, social media updates, electronic books (ebooks), electronic magazines, digital newspapers, digital audio books, electronic journals, web blogs, real simple syndication (RSS) feeds, electronic comic books, software applications, etc. In some implementations, content item 121 is also referred to as a media item.

A content item 121 may be consumed via a communication application 111, the Internet, etc. As used herein, "media," "media item," "online media item," "digital media," "digital media item," "content," and "content item" can include an electronic file that can be executed or loaded using software, firmware or hardware configured to present the digital content item to an entity. In one implementation, the content sharing platform 120 may store the content items 121 using the data store 106.

Mobile platform 150 may be and/or include one or more computing devices (e.g., servers), data stores, networks (e.g., phone network, cellular network, local area network, the Internet, and/or a combination of networks), software components, and/or hardware components that may be used to allow users to connect to, share information, and/or interact with each other using one or more mobile devices (e.g., phones, tablet computers, laptop computers, wearable computing devices, etc.) and/or any other suitable device.

For example, the mobile platform 150 may enable telephony communication, Short Message Service (SMS) messaging, Multimedia Message Service (MMS) messaging, text chat, video chat, and/or any other communication between users.

The social network platform 160 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the social network platform 160 may allow a user to consume, upload, search for, approve of ("like"), dislike, and/or comment on media items.

In certain implementations, collaboration platform 155 can enable collaboration services, such as SMS messaging, MMS messaging, instant messaging, text messaging, text chat, video chat, social network messaging, audio and/or videoconferences (e.g., among the users of devices 102A-N) using, for example, streaming video or voice over IP (VoIP) technologies, cellular technologies, LAN and/or WAN technologies, and may be used for personal, entertainment, business, educational or academically oriented interactions. Collaboration platform 155 can provide video conferencing services or may provide video conferencing services along with other services including, for example, news services, social networking services and/or content hosting services. For instance, the collaboration platform 155 may allow a user to view a video clip or a news article and start a videoconference while viewing the video clip or the news article. In another example, the collaboration platform 155 may allow a user to start a videoconference while visiting a social networking site or video content hosting site. The client devices 110A through 110Z may each include computing devices such as personal computers (PCs), laptops, mobile phones, smart phones, tablet computers, netbook computers etc. In some implementations, client device 110A through 110Z may also be referred to as "user devices."

Each client device includes a communication application 111. In one implementation, the communication applications 111 may be applications that allow users to compose, send, and receive user communications between the users in real-time over the collaboration platform 155, mobile platform 150, and/or network 105 and/or a combination of networks. For example, the communication application 111 may be a text messaging application, instant messaging application, video messaging application, social network messaging application, video chatting application, and/or videoconferencing application, or any combination of such applications. The user communications can be text messages (e.g., SMS (short message service) messages, MMS (multimedia messaging service) messages), instant messenger messages created via an instant message service, video/audio and/or content streams, video chat messages and/or video/audio streams, video messages, social networking messages, etc. The communication application 111 in a client device can render, display, and/or present one or more user communications and/or media items in one or more collaboration sessions to a user.

In one implementation, the server 130 may include a content sharing component 140. The content sharing component 140 and/or the communication application 111 can provide various content sharing functions. For example, the content sharing component 140 and/or the communication application 111 can select a media item (e.g., video clip, audio clip, animated image) to represent a user communication, which is created by a user via the communication application 111, and send the selected media item to one or more users via the communication applications 111 in one or more client devices 110 to be part of one or more collaboration sessions.

For example, the communication application 111 can provide one or more user interfaces to prompt a user of the client device 110 to provide a user communication (e.g., video conference communication, text message, instant message, video message, social networking message). The content sharing component 140 can receive the content of the user communication from a communication application 111 and search the content items 121 in the content sharing platform 120 and/or data store 106 for one or more media items (e.g., video clips, audio clip, animated images) that are related to the content of the user communication, select a media item as a media content representation of the user communication, and add the selected media item to a collaboration session. The content sharing component 140 can include speech recognition technology and speech conversion technology to recognize voice and speech during video conferences and/or video chats to convert the speech to text.

The content items 121 can include content well-known to the general population (including users of content sharing platform 120, collaboration platform 155 and social network platform 160) such as content associated with pop culture. Pop culture is the ideas, perspective, attitudes, images, and other phenomena that are within the mainstream of a given culture. Content that is associated with pop culture (hereinafter referred to as "well-known" content) can include mass media communications that permeate the everyday lives of the society. Categories of pop culture can include entertainment (movies, music, TV), sports, news (as in people/places in news), politics, fashion/clothes, technology, phrases and slang. A media content representation of a user communication can be created using one or more content items 121, which include, for example, a music video, a video of a movie, a video of news, a video of a television show episode, audio clips, etc. For example, a media content representation of a user communication can be a short portion of a popular television show or movie, a short portion of a song, etc.

The content sharing component 140 can send the media content representation to one or more communication applications 111. The media content representation can be consumed via a communication application 111. The communication application 111 can include a media player (e.g., a Flash® player or an HTML5 player) for rendering the media content representation (e.g., video clip, audio clip, animated image). The communication applications 111 can be provided to the client devices 110A through 110Z by the server 130 and/or content sharing platform 120.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

The mobile platform 150 and/or collaboration platform 155 can present to a user a listing (e.g., activity feed, feed, stream, wall, etc.) of objects (e.g., posts, content items (e.g., videos, images, audios, etc.), status updates, favorability indications, tags, messages, etc.) generated by other users of the mobile platform 150 and/or the collaboration platform 155. The mobile platform 150 and/or collaboration platform 155 may also include a content sharing aspect that allow users to upload, view, tag, share, and/or perform any other function on content, such as text content, video content, image content, audio content, etc. Other users of the mobile platform 150 and/or collaboration platform 155 may comment on the shared content, discover new content, locate updates, share content, and otherwise interact with the provided content.

In one implementation, the content sharing platform 120 can be integrated with the mobile platform 150 and/or collaboration platform 155. For example, the mobile platform 150 and/or collaboration platform 155 may use the content sharing platform 120 to provide users with content sharing, content storage, content streaming, content processing, and/or any other service. In one example, a user of the mobile platform 150 and/or collaboration platform 155 may upload and/or share content via the content sharing platform 120. In another implementation, the mobile platform 150 and/or collaboration platform 155 may be separate from the content sharing platform 120.

In one implementation, the server 130 is one or more computing devices (e.g., a rackmount server, a server computer, etc.). In one implementation, the server 130 is included in the content sharing platform 120, the collaboration platform 155 and/or the mobile platform 150. In another implementation, the server 130 is separate from the content sharing platform 120, the collaboration platform 155 and/or the mobile platform 150, but may communicate (e.g., exchange data with) the content sharing platform 120, the collaboration platform 155, and/or the mobile platform 150.

In one implementation, a user (also referred to herein as the "creator user" or "sender user") uses the communication application 111 to initiate the selection and/or creation of a media item to represent a user communication. For example, the communication application 111 can receive user input for creating a user communication (e.g., text message, instant message, and video chat stream). The communication application 111 can then transmit a request to select a media item to represent the user communication to the content sharing component 140. The request can include any suitable information related to the media item that is to be selected and/or created. The information can include the content of the user communication, a user identifier of the creator user, etc.

Upon receiving the request for a media item to represent a user communication, the content sharing component 140 can search the content items 121 in the content sharing platform 120 and/or data store 106 for one or more media items (e.g., video clips, audio clip, animated images) that are related to the content of the user communication, select a media item as a representation of the user communication, and then transmit to one or more communication applications 111 to add the media item to a collaboration session. The media content representation can be sent to the client device of the creator user and/or to the client device of one or more target users. A "target user" hereinafter refers to an intended recipient user of the user communication being sent by the creator user. The data for the presentation can include, for example, data to be used to render one or more user interfaces, data to be used to provide playback of the media item, etc.). In some implementations, the communication application 111 automatically provides playback of the media item.

Although implementations of the disclosure are discussed in terms of content sharing platforms, implementations may also be generally applied to any type of communication application and/or communication network providing connections between users or to any type of content delivery platform providing content to end users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120, the server 130, the content sharing component 140, the mobile platform 150, and/or any other component of the system 100.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 2:
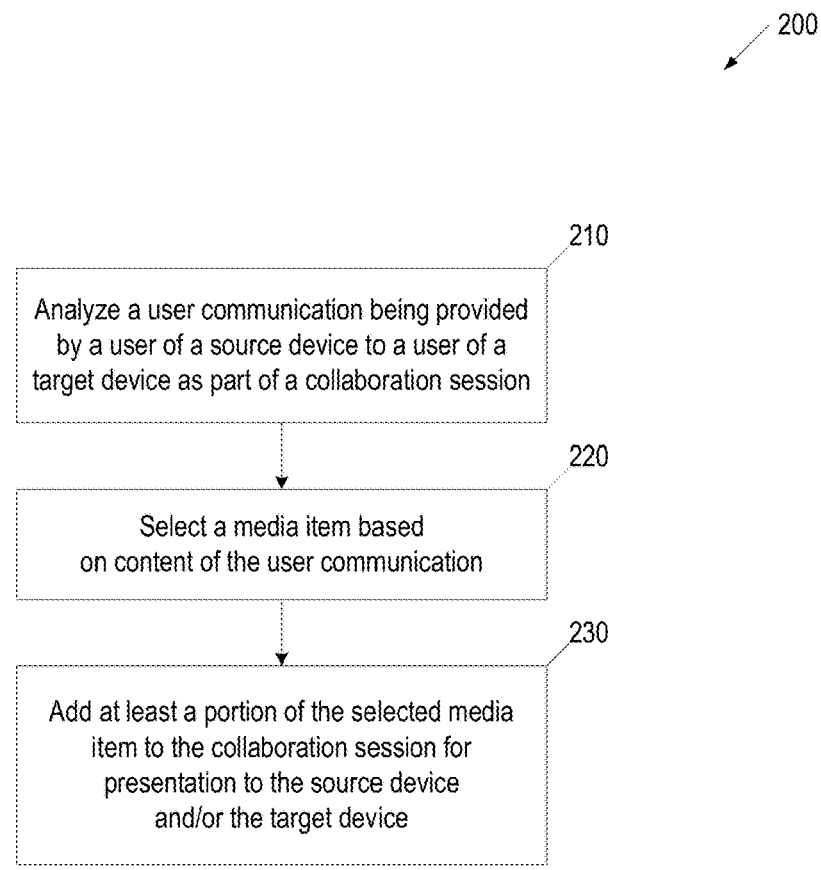
FIG. 2 depicts a flow diagram of aspects of a method for adding a media item to a collaboration session as a representation of a user communication, in accordance with one implementation of the present disclosure.

FIG. 2 depicts a flow diagram of aspects of a method 200 for adding a media item to a collaboration session as a representation of a user communication, in accordance with one implementation of the present disclosure. The method is performed by processing logic that may comprise hardware (circuitry, dedicated logic, etc.), software (such as is run on a general purpose computer system or a dedicated machine), or a combination of both. In one implementation, the method is performed by a content sharing component 140 in a server 130 computing machine of FIG. 1, while in some other implementations one or more blocks of FIG. 2 may be performed by another machine. For example, in various alternative implementations, the at least a portion of the method can be performed by/at client devices 110A-110Z of FIG. 1. In one implementation, a processing device of a server 130 as shown in FIG. 1 performs method 200.

At block 210, the processing device analyzes a user communication that is being provided by a user of a source device to a user of a target device as part of a collaboration session. The user communication can be created at a source client device to be sent to one or more target client devices. The processing device can receive the user communication from the source client device. The user communication can be a text message (e.g., SMS message, MMS message), an instant message, a video message, or a video stream and/or an audio stream. In one implementation, the processing device receives a request for a media item to represent a user communication. The request can include the content of the user communication, a user identifier of the creator user, etc.

At block 220, the processing device selects a media item based on content of the user communication. The processing device can select one or more media items. The media item(s) can be selected from the content items (e.g., content items 121 in FIG. 1), such as, and not limited to, video clips, audio clips, and/or animated images. The processing device can select the media item(s) by mapping content of the user communication to a well-known object ("pop culture object"), such as, and not limited to an entertainment object (e.g., a figure in entertainment industry or an entertainment item such as a movie, a song, a TV show, etc.), sports object (e.g., sports figure, sports moment, sports event), news object (as in people/places in news), a political object (e.g., political figure, political event), a fashion object (e.g., clothes item), a technology related object, a phrase, and slang that is well-known by a mass of people. One implementation of selecting one or more media items based on the content of the user communication is described in greater detail below in conjunction with FIG. 6.

At block 230, the processing device adds at least a portion of the selected media item to the collaboration session for presentation to the source device and/or target device. A selected media item can be used as a representation of a user communication. One or more selected media items can be edited (e.g., cropped, combined) to be used as a single representation of a user communication. For example, the processing device can locate specific content from the selected media item and trim the selected media item. For example, the processing device can locate the most popular segments of a music video, such as segments that contain the chorus of a song, trim the music video to include only the popular segments, and generate a media content representation of the user communication using the popular segments of the music video. The length of the media item that is representing the user communication can be based on the length of the popular segments. The length of the media content representation to use can be determined from configuration data that is stored on a client device or stored in a data store (e.g., data store 106 in FIG. 1). The length of the media representation is configurable and/or user-defined. In another example, the processing device can combine multiple selected media items to generate a single media content representation.

The processing device provides the media content representation to the source device and/or the one or more target devices. The processing device can transmit the media content representation and/or the user communication to be rendered on the source device and/or the one or more target devices. In one implementation, the media item that represents the user communication is presented (e.g., played) on a device concurrently with the user communication being displayed on the device. The source device and/or the one or more target devices can display and consume (e.g., play) the media content representation in a user interface of a communication application on the device. The source device and/or the one or more target devices can also display the user communication with the media item. The communication application can provide an option to disable audio of the media content representation. In one implementation, the media item that represents the user communication is rendered on a device without the user communication being displayed on the device.

In one implementation, the processing device selects multiple media items and provides the multiple selected media items to a creator user as options from which the creator user can select from. The client device can display the multiple media items and the creator user can select one or more of the media items for creating a representation of a user communication. The processing device can receive input of the user selection of one of the multiple media items and provide the user selected media item to the source device and/or the one or more target devices. The processing device can receive user selection of multiple media items and edit (e.g., trim, combine) the multiple user selected media items to create a single media item, and provide the single media item to the source device and/or the one or more target devices as a representation of the user communication.

Figure 3:
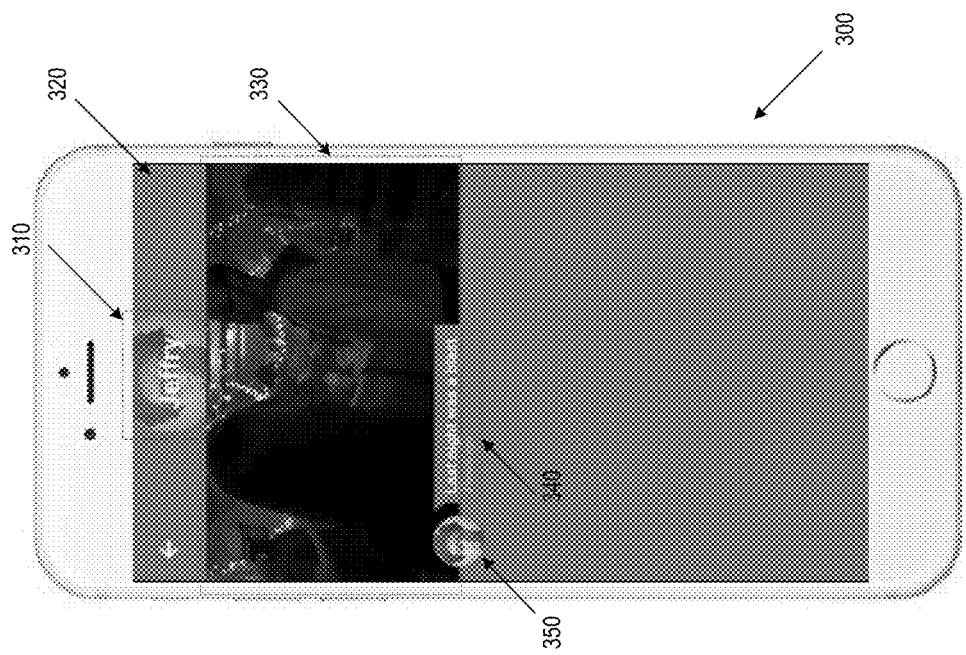
FIG. 3 depicts an exemplary interface of a communication application for consuming media content representing a user communication, in accordance with one implementation of the present disclosure.

FIG. 3 illustrates an example user interface 320 of a communication application for consuming media content representing a user communication, in accordance with one implementation of the present disclosure. As illustrated, a target device 300 can receive a user communication and render the user communication (e.g., text message 340) in a user interface 320. For example, the text message 340 is "Last night was a blast". The text message 340 can be received from a source device of a creator user (e.g., Jeffry). The user interface 320 can include a user identifier 310 of the creator user that has sent the text message 340 to the target device 300. The user identifier 310 can be a name and/or image representation of the creator user.

The user interface 320 can concurrently present (e.g., play) a media item 330 (e.g., video) that is representing the user communication and the user communication (e.g., text message 340). In one implementation, the user communication (e.g., text message 340) is displayed over the media item 330. The media item 330 can automatically be played when the media item 330 is received by a device. The media item 330 can be a well-known item, such as an item that is associated with pop culture, and can correspond to the content of the user communication (e.g., text message 340) "Last night was a blast". For example, the media item 330 can be a portion of a well-known music video for the song "Blast Last Night" by the musical artists "The Deadbeats." The portion of the music video can correspond to the lyrics that include "I had a blast last night" and the user communication (e.g., text message 340) can be displayed at the same time that the media item 330 (e.g., video) is being played. The target user can hear the music and lyrics "I had a blast last night" while the text message 340 "Last night was a blast" is being displayed. In one implementation, an identifier 350 of the creator user is displayed when the user communication (e.g., text message 340) and/or media item 330 is displayed.

Figure 4:
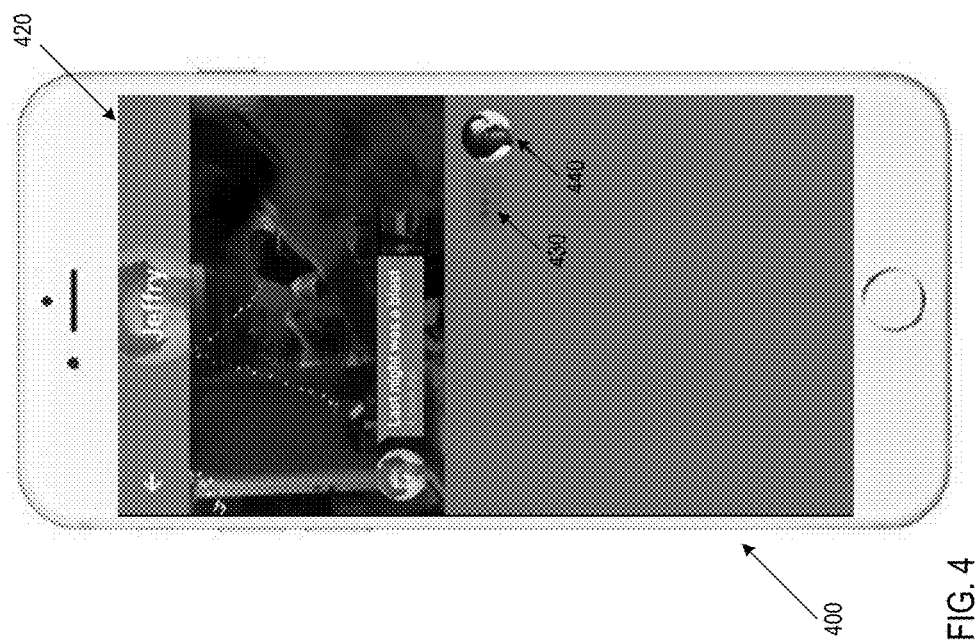
FIG. 4 illustrates an example user interface of a communication application for consuming one or more media items representing user communications in a collaboration session, in accordance with one implementation of the present disclosure.

FIG. 4 illustrates an example user interface 420 of a communication application for consuming one or more media items representing user communications in a collaboration session, in accordance with one implementation of the present disclosure. The request to select and/or create a media item as a representation of a user communication can be made by a source device 400. As illustrated, the source device 400 can receive user input, via a user interface 420, from a creator user for generating a message. The user interface 420 can include a keyboard (not shown) for receiving the user input. The user interface 420 can display an image 440 representing the creator user. The user interface 420 can display a visual indicator 430 indicating that the creator user is composing a message to be sent to one or more target devices. For example, the user input may be "Hello!". The source device 400 can detect the user input for the user communication and send a request for a media item to represent the user communication to the content sharing component (e.g., content sharing component 140 in FIG. 1) on a server. When a media item is selected and/or created for the user communication, the media item and/or the user communication can be presented (e.g., displayed, played) on the source device as illustrated in FIG. 5, and on the one or more target devices.

Figure 5:
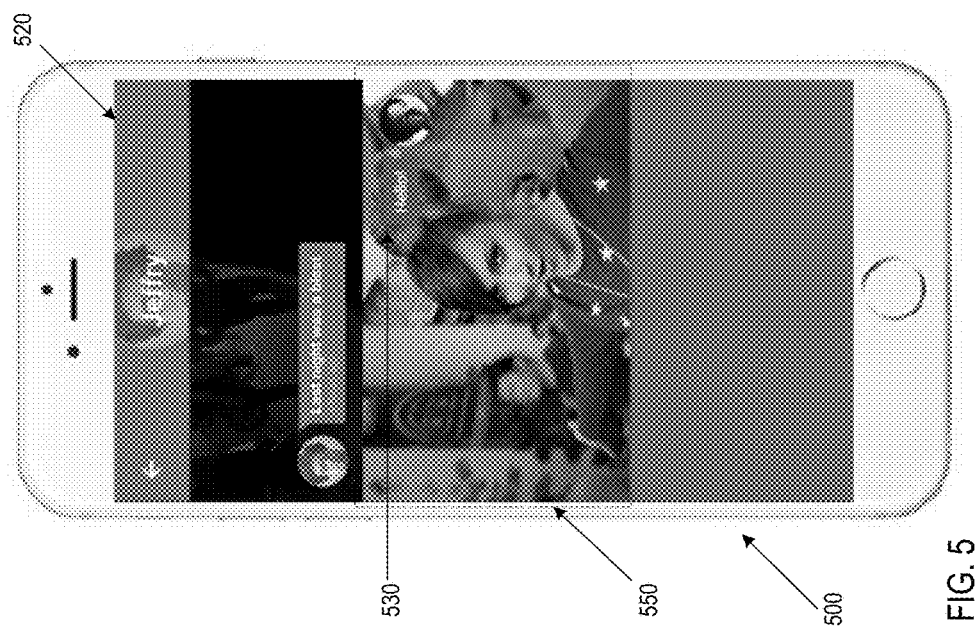
FIG. 5 illustrates an example user interface of a communication application for consuming one or more media items representing user communications in a collaboration session, in accordance with one implementation of the present disclosure.

FIG. 5 illustrates an example user interface 520 of a communication application for consuming one or more media items representing user communications in a collaboration session, in accordance with one implementation of the present disclosure. The source device 500 can receive a media item 550 (e.g., video) as a representation for the user communication (e.g., text message 530) "Hello!" and can display the user communication (e.g., text message 530) "Hello!" at the same time as the media item 550 is being played in the user interface 520. For example, the media item 550 may be a portion of a music video for the song "Hello" by the musical artists "Karmin." The portion of the music video can correspond to the lyrics that include "Hello". The media item 550 and user communication (e.g., text message 530) can be rendered on one or more target devices. The users of the respective devices (e.g., source device, target device(s)) can hear the music and lyrics "Hello" while the user communication (e.g., text message 530) "Hello!" is being displayed.

Figure 6:
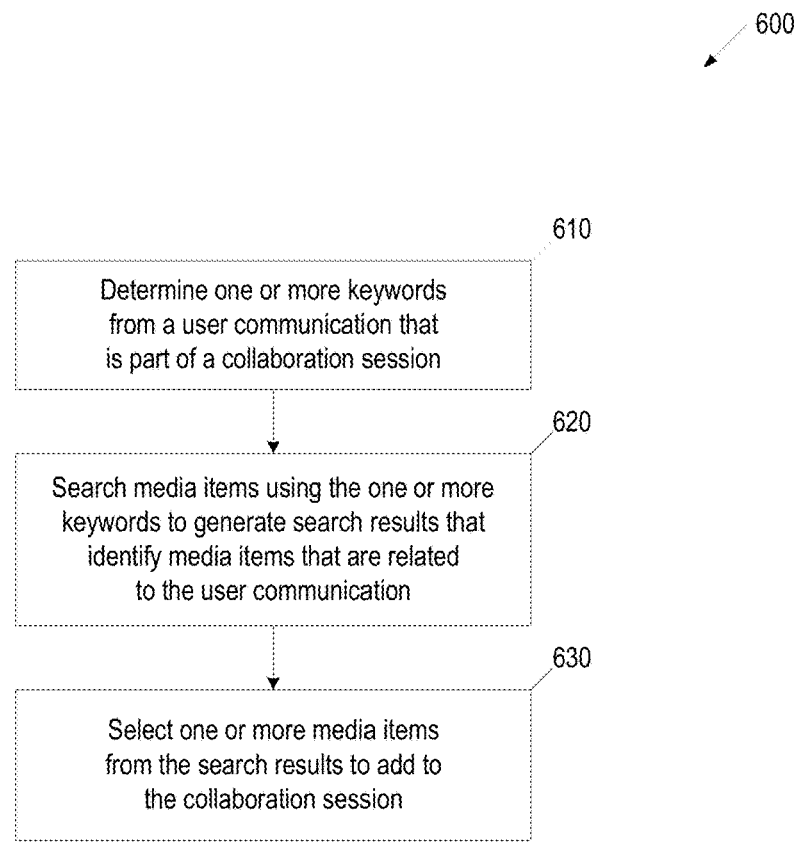
FIG. 6 depicts a flow diagram of aspects of a method for selecting a media item as a representation of a user communication, in accordance with one implementation of the present disclosure.

FIG. 6 depicts a flow diagram of aspects of a method 600 for selecting a media item as a representation of a user communication, in accordance with one implementation of the present disclosure. The method is performed by processing logic that may comprise hardware (circuitry, dedicated logic, etc.), software (such as is run on a general purpose computer system or a dedicated machine), or a combination of both. In one implementation, the method is performed by a content sharing component 140 in a server 130 computing machine of FIG. 1, while in some other implementations one or more blocks of FIG. 6 may be performed by another machine. For example, in various alternative implementations, the at least a portion of the method can be performed by/at client devices 110A-110Z of FIG. 1.

At block 610, the processing device determines one or more keywords from content of a user communication. The user communication content can include characters, emotion icons, emojis, stickers, images, video content, and audio content. An emotion icon (emoticon) is a meta-communicative pictorial representation of a facial expression that, in the absence of body language, serves to draw a recipient's attention to the tenor or temper of a sender's nominal non-verbal communication. An emoticon can be made from stylized pictures, punctuation marks, numbers and/or letters. An emoji is a small digital picture or pictorial symbol that represents a feeling, concept, etc. used in text messages and other electronic communications and usually part of a standardized set. A sticker is a detailed illustration of a character that represents an emotion or action that is a mix of cartoons and emojis. Stickers are elaborate, character-driven emoticons.

The processing device can parse the content of the user communication to locate one or more keywords in the user communication. The processing device can use natural language processing, natural semantic understanding, translation of one human language to another, information extraction (the extraction of semantic information from text), named entity recognition (locate and classify elements in text into pre-defined categories such as the names of persons, organizations, locations, expressions of times, quantities, monetary values, percentages, etc.), etc. for determining one or more keywords in the user communication. The processing device can use image processing to detect one or more key features of an image in the user communication and translate the detected features to one or more keywords. The processing device can use speech recognition technology and/or speech conversion technology to recognize voice and speech during video conferences and/or video chats to convert the speech to text.

At block 620, the processing device searches media items using the one or more keywords to generate search results that identify one or more media items that are related to the user communication. The processing device can create a search query using the one or more keywords and execute the search query to search the media items to generate the search results.

The search results include media items that have well-known content, such as content associated with pop culture. For example, the search results can include music videos, movie trailers, television show video clips, audio clips, etc. The search results can map content of the user communication to an entity, such as, and not limited to an entertainment (e.g., movies, music, TV) item, sports item (e.g., sports figure, sports moment, sports event), news item (as in people/places in news), a political item (e.g., political figure, political event), a fashion item (e.g., clothes item), a technology related item, a phrase, and slang.

At block 630, the processing device selects one or more media items from the search results to use for a representation of the user communication. In one implementation, the processing device selects the highest ranked media item in the search results. The ranking can be based on data associated with the media items, such as, click rate, consumption time, consumption rate, drop-off rate, likes, dislikes, shares, recommendations, views, purchases, etc. In another implementation, the processing device selects multiple media items (e.g., videos) from the search results, and presents the multiple media items to a user. In one implementation, the processing device uses user information of creator user to select one or more media items.

Figure 7:
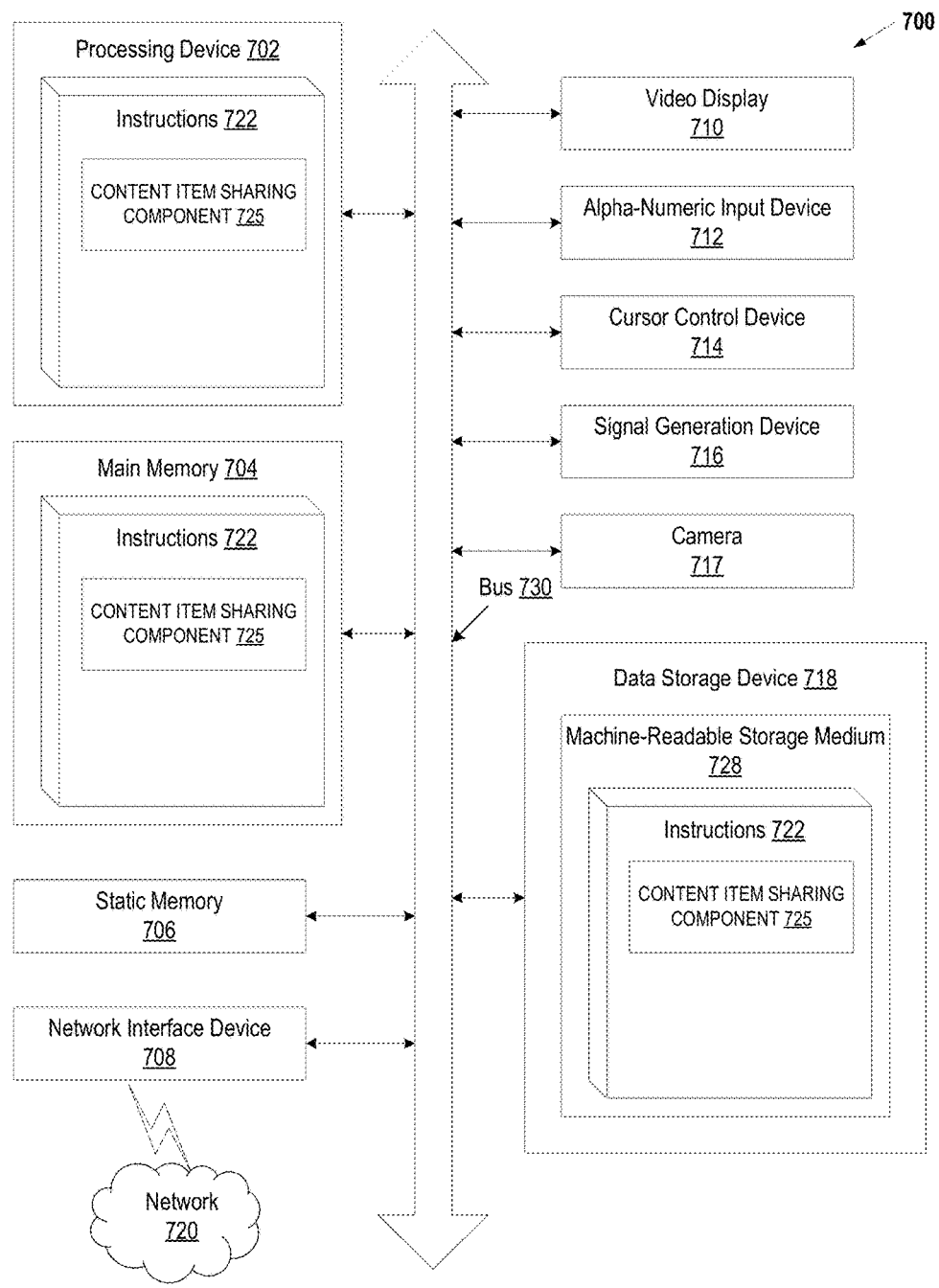
FIG. 7 depicts a block diagram of an example computing device operating in accordance with one or more aspects of the present disclosure.

FIG. 7 illustrates a diagram of a machine in an example form of a computer system 700 within which a set of instructions, for causing the machine to perform any one or more of the methodologies discussed herein, can be executed, in accordance with one implementation of the present disclosure. The computer system 700 can be client device 110A-110N in FIG. 1. The computer system 700 can be server 130 computing machine in FIG. 1. In alternative implementations, the machine can be connected (e.g., networked) to other machines in a LAN, an intranet, an extranet, or the Internet. The machine can operate in the capacity of a server or a client machine in client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 730.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices such as an application specific integrated circuit (ASIC), a field programmable gate array (FPGA), a digital signal processor (DSP), network processor, or the like. The processor 702 is configured to execute instructions 722 for performing the operations and steps discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 716 (e.g., a speaker). The computer system 700 also can include a camera 717 to record images that can be stored directly, transmitted to another location, or both. These images can be still photographs or moving images such as videos or movies.

The data storage device 718 can include a computer-readable storage medium 728 on which is stored one or more sets of instructions 722 (e.g., software) embodying any one or more of the methodologies or functions described herein. The instructions 722 can also reside, completely or at least partially, within the main memory 704 and/or within the processor 702 during execution thereof by the computer system 700, the main memory 704 and the processor 702 also constituting computer-readable storage media. The instructions 722 can further be transmitted or received over a network 720 via the network interface device 708.

In one embodiment, the instructions 722 include instructions for a content item sharing component 725, which may correspond, respectively, to messaging application 111 and/or content sharing component 140 described with respect to FIG. 1, and/or a software library containing methods that provide a dynamic representation of a message. While the computer-readable storage medium 728 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "analyzing", "selecting", "adding", "playing", "displaying", "determining", "searching", "providing", "receiving", "modifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    analyzing, by a processing device, a user communication as the user communication is being provided by a user of a source device to a user of a target device as part of a collaboration session between the user of the source device and the user of the target device;
    selecting a media item based on content of the user communication;
    adding at least a portion of the selected media item to the collaboration session for presentation in a user interface of the collaboration session to at least one of the source device or the target device, wherein an initial portion of the user interface comprises the user communication overlaid with the at least the portion of the selected media item;
    selecting at least a portion of another media item based on subsequent content of a subsequent user communication of the collaboration session; and
    adding the at least the portion of the another media item to a subsequent portion of the user interface that is adjacent to the initial portion, wherein the subsequent portion of the user interface comprises the subsequent user communication overlaid with the at least the portion of the another media item.

2. The method of claim 1, wherein adding at least the portion of the selected media item to the collaboration session comprises:
    concurrently playing at least the portion of the selected media item and displaying the user communication.

3. The method of claim 1, wherein the selected media item comprises at least one of video content, audio content, or an animated image.

4. The method of claim 1, wherein the selected media item comprises content from at least one of a movie, a music video, or a television show.

5. The method of claim 1, wherein selecting the media item comprises:
    determining one or more keywords from the content of the user communication;
    searching a repository of a plurality of media items using the one or more keywords to generate search results; and
    selecting the media item from the search results.

6. The method of claim 1, wherein selecting the media item comprises: selecting a plurality of media items based on the content of the user communication;
    providing the plurality of media items to the user of the source device; and
    receiving a user selection, from the user of the source device, of one of the plurality of media items.

7. The method of claim 1, wherein the user communication is at least one of a text message, an instant message, a video message, a social networking message, a video stream, or an audio stream.

8. A system comprising:
    a memory; and
    a processing device, coupled to the memory, to:
    analyze a user communication as the user communication is being provided by a user of a source device to a user of a target device as part of a collaboration session between the user of the source device and the user of the target device;
    select a media item based on content of the user communication;
    add at least a portion of the selected media item to the collaboration session for presentation in a user interface of the collaboration session to at least one of the source device or the target device, wherein an initial portion of the user interface comprises the user communication overlaid with the at least the portion of the selected media item;
    select at least a portion of another media item based on subsequent content of a subsequent user communication of the collaboration session; and
    add the at least the portion of the another media item to a subsequent portion of the user interface that is adjacent to the initial portion, wherein the subsequent portion of the user interface comprises the subsequent user communication overlaid with the at least the portion of the another media item.

9. The system of claim 8, wherein to add at least the portion of the selected media item to the collaboration session, the processing device is further to:
    concurrently play at least the portion of the selected media item and display the user communication.

10. The system of claim 8, wherein the selected media item comprises at least one of video content, audio content, or an animated image.

11. The system of claim 8, wherein the selected media item comprises content from at least one of a movie, a music video, or a television show.

12. The system of claim 8, wherein to select the media item, the processing device is further to:
    determine one or more keywords from the content of the user communication;
    search a repository of media items using the one or more keywords to generate search results; and
    select the media item from the search results.

13. The system of claim 8, wherein to select the media item, the processing device is further to:
    select a plurality of media items based on the content of the user communication;
    provide the plurality of media items to the user of the source device; and
    receive a user selection, from the user of the source device, of one of the plurality of media items.

14. The system of claim 8, wherein the user communication is at least one of a text message, an instant message, a video message, a social networking message, a video stream, or an audio stream.

15. A non-transitory computer readable medium having instructions stored thereon that, when executed by a processing device, cause the processing device to perform operations comprising:

analyzing, by the processing device, a user communication as the user communication is being provided by a user of a source device to a user of a target device as part of a collaboration session between the user of the source device and the user of the target device;

selecting a media item based on content of the user communication;

adding at least a portion of the selected media item to the collaboration session for presentation in a user interface of the collaboration session to at least one of the source device or the target device, wherein an initial portion of the user interface comprises the user communication overlaid with the at least the portion of the selected media item;

selecting at least a portion of another media item based on subsequent content of a subsequent user communication of the collaboration session; and adding the at least the portion of the another media item to a subsequent portion of the user interface that is adjacent to the initial portion, wherein the subsequent portion of the user interface comprises the subsequent user communication overlaid with the at least the portion of the another media item.

16. The non-transitory computer readable medium of claim 15, wherein adding at least the portion of the selected media item to the collaboration session comprises:

concurrently playing at least the selected media item and displaying the user communication.

17. The non-transitory computer readable medium of claim 15, wherein the selected media item comprises at least one of video content, audio content, or an animated image.

18. The non-transitory computer readable medium of claim 15, wherein the selected media item comprises content from at least one of a movie, a music video, or a television show.

19. The non-transitory computer readable medium of claim 15, wherein selecting the media item comprises:

selecting a plurality of media items based on the content of the user communication;

providing the plurality of media items to the user of the source device; and receiving user selection, from the user of the source device, of one of the plurality of media items.

20. The non-transitory computer readable medium of claim 15, wherein the user communication is at least one of a text message, an instant message, a video message, a social networking message, a video stream, or an audio stream.

\* \* \* \* \*